US009788330B2

(12) United States Patent
Guo et al.

(10) Patent No.: US 9,788,330 B2
(45) Date of Patent: Oct. 10, 2017

(54) METHOD AND DEVICE FOR PROCESSING AND INDICATING DOWNLINK DATA

(71) Applicant: ZTE Corporation, Shenzhen (CN)

(72) Inventors: Senbao Guo, Shenzhen (CN); Yunfeng Sun, Shenzhen (CN); Chenchen Zhang, Shenzhen (CN); Min Ren, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 66 days.

(21) Appl. No.: 14/373,235

(22) PCT Filed: Jan. 10, 2013

(86) PCT No.: PCT/CN2013/070309
§ 371 (c)(1),
(2) Date: Jul. 18, 2014

(87) PCT Pub. No.: WO2013/107319
PCT Pub. Date: Jul. 25, 2013

(65) Prior Publication Data
US 2014/0369293 A1 Dec. 18, 2014

(30) Foreign Application Priority Data
Jan. 19, 2012 (CN) .......................... 2012 1 0017706

(51) Int. Cl.
H04W 72/08 (2009.01)
H04B 7/024 (2017.01)
(Continued)

(52) U.S. Cl.
CPC ......... *H04W 72/082* (2013.01); *H04L 5/0073* (2013.01); *H04L 5/0091* (2013.01);
(Continued)

(58) Field of Classification Search
None
See application file for complete search history.

(56) References Cited

U.S. PATENT DOCUMENTS

2009/0227263 A1* 9/2009 Agrawal ............... H04W 16/16
455/452.1
2010/0215011 A1* 8/2010 Pan ....................... H04L 5/0064
370/329

(Continued)

FOREIGN PATENT DOCUMENTS

CN 101605356 12/2009
CN 101917729 12/2010
(Continued)

OTHER PUBLICATIONS

3GPP TSG RAN WGI Meeting #67, "*Signalling Requirements for PDSCH Mapping for DL CoMP*", San Francisco, CA, US, Nov. 14-18, 2011.
(Continued)

*Primary Examiner* — Peter Chau
(74) *Attorney, Agent, or Firm* — Diederiks & Whitelaw, PLC

(57) ABSTRACT

Disclosed are a method and device for processing and indicating downlink data. The method for processing the downlink data includes: a user equipment (UE) receiving multiple sets of resource indication information configured for the UE by a base station and transmitted by the base station via a high-layer signaling; the UE receiving a subframe transmitted by the base station, acquiring downlink grant indication information in the subframe; the UE selecting from the multiple sets of resource indication information the resource indication information matching the downlink grant indication information, wherein the resource indication information is used for indicating a resource location having interference present, or, the resource location having (Continued)

interference present and interference information corresponding to the resource location; and the UE processing on the resource location the interference of the downlink data transmitted to the UE. The disclosure allows the implementation of coordinated transmission among different nodes to one UE.

16 Claims, 3 Drawing Sheets

(51) Int. Cl.
    *H04L 5/00*     (2006.01)
    *H04W 72/04*     (2009.01)

(52) U.S. Cl.
    CPC ............ *H04B 7/024* (2013.01); *H04L 5/0035* (2013.01); *H04L 5/0048* (2013.01); *H04L 5/0053* (2013.01); *H04W 72/042* (2013.01)

(56) References Cited

U.S. PATENT DOCUMENTS

| | | | |
|---|---|---|---|
| 2011/0019776 A1* | 1/2011 | Zhang | H04L 5/0023 375/340 |
| 2011/0194536 A1* | 8/2011 | Kim | H04L 5/0023 370/335 |
| 2012/0009965 A1* | 1/2012 | Nakamura | H04L 5/0037 455/509 |
| 2012/0082022 A1* | 4/2012 | Damnjanovic | H04J 11/005 370/201 |
| 2012/0207119 A1* | 8/2012 | Zhang | H04L 5/0023 370/329 |
| 2012/0258724 A1 | 10/2012 | Kim et al. | |
| 2013/0114428 A1* | 5/2013 | Koivisto | H04B 7/024 370/252 |

FOREIGN PATENT DOCUMENTS

| | | |
|---|---|---|
| EP | 2369776 | 9/2011 |
| WO | WO 2009/101460 | 8/2009 |
| WO | WO 2011/074865 | 6/2011 |
| WO | WO 2011/132721 | 10/2011 |

OTHER PUBLICATIONS

3GPP TSG RAN WGI Meeting #66bis, *"Consideration on Downlink Control Signaling Configuration for CoMP"*, Zhuhai, CN, Oct. 10-14, 2011.

\* cited by examiner

METHOD AND DEVICE FOR PROCESSING AND INDICATING DOWNLINK DATA

CROSS-REFERENCE TO RELATED APPLICATIONS

This application represents a National Stage of PCT/CN2013/0070309 filed on Jan. 10, 2013 which claims priority to Chinese Application No. 201210017706.X, filed on Jan. 19, 2012. The entire disclosure of each of the above applications is incorporated herein by reference.

TECHNICAL FIELD

The disclosure relates to the field of communication, in particular to a method and device for processing and indicating downlink data.

BACKGROUND

R11 release technologies are accurately studied successively after LTE (Long Term Evolution) system undergoes several releases of R8/9/10. Presently, some of R8 release products begin to be commercially used gradually, and products under R9 release and R10 release remain to be further planned.

After the stages of R8 release and R9 release, R10 release is added with many new properties on the basis of the prior two releases, such as the pilot frequency property, for example, DMRS (Demodulation Reference Signal) and CSI-RS (Channel State Information Reference Signal), and transmission and feedback properties supporting 8 antennae, etc., and particularly, eICIC (Enhanced Inter-Cell Interference Cancelling) technology takes an interference avoiding technology among cells into consideration on the basis of ICIC in R8/9 releases. In terms of the technologies for solving interference problem among the cells, cell interference avoiding in a homogeneous network is considered at the initial stage of the R10 release, wherein the eICIC technology and CoMP (Coordinated Multi-point) technology serve as the mainstream technology, and in the CoMP technology, multi-points coordinate to send data to one or more UEs on the same time-frequency resources or different time-frequency resources, and therefore, CoMP can reduce the interference among the cells, increase throughput efficiency of cell edges and enlarge the coverage of the cells. However, considering the situation of heterogeneous network introducing more scenarios, the complexity of the CoMP technology and time limitation on the R10 release discussion in the late discussion, final decision is made that additional CoMP standardization contents are not introduced at the stage of R10 release and some demands of CoMP can be considered when CSI-RS is designed, therefore, the CoMP technology is not further discussed after the 60 bis conference.

LTE defines that PDCCHs (Physical downlink control channel) are used to bear scheduling allocation and other control information, wherein each PDCCH consists of several CCEs (Control Channel Element) and the number of CCEs of each subframe is determined by the number of PDCCHs and a downlink bandwidth.

A UE (User Equipment) obtains the PDCCHs through blind detection in a search space, wherein the search space is divided into a common search space and a UE-specific search space, the common search space is the area which can be searched by all the UEs, and this space carries cell-specific information; and the UE-specific search space is a space range which can be searched by a single UE, the UE-specific search spaces of a plurality of UEs can be overlapped, but the general initial search locations of the UE-specific search spaces of respective UEs are different. Before the UE performs the blind detection, a base station informs, generally through a high-layer signaling, the UE of the working mode to be used and the RNTI (Radio Network Temporary Identity) type to be used for CRC (Cyclic Redundancy Check) scrambling for the PDCCH.

Table 1 shows the relationship among the search space $S_k^{(L)}$, an aggregation level L and the number $M^{(L)}$ of candidate PDCCHs in table 1. The aggregation level is the number of CCEs occupied by the PDCCH. When the UE performs blind detection in the UE-specific search space, the UE firstly calculates blind detection a start location $Y_K$ according to UE ID (user identification) and subframe number, etc., and then performs detection in the UE-specific search space until the UE has detected the PDCCH allocated to itself.

TABLE 1

PDCCH candidate set

Search space $S_k^{(L)}$

| Type | Aggregation level L | Size [number of CCEs] | The number $M^{(L)}$ of candidate PDCCHs |
|---|---|---|---|
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

Table 2 shows the relevant location and correlation of the aggregation level and the first control channel element of the PDCCH in the UE-specific search space. The relevant location of the first control channel element of the PDCCH in the UE-specific search space is the relevant location (represented by nCCE, offset in the specification) between the index nCCE of the first CCE occupied by the PDCCH and the blind detection start location $Y_K$, wherein nCCE, offset=nCCE−$Y_K$. As shown in table 2, it is a schematic diagram of possible location of the first CCE and the aggregation level corresponding thereto in the UE-specific search space.

TABLE 2

Correlation between the aggregation level and the location of the firstCCE

| Aggregation level | The relevant location of the first CCE in the UE-specific search space |
|---|---|
| L = 1 | nCCE, offset = 0/1/2/3/4/5 |
| L = 2 | nCCE, offset = 0/2/4/6/8/10 |
| L = 3 | nCCE, offset = 0/4 |
| L = 4 | nCCE, offset = 0/8 |

During the discussion on the LTE technology in the latest 67th conference, the proposals on downlink control signaling all focus on CSI-RS signaling enhancement, DMRS signaling enhancement, CRS (Cell-Specific Reference Signal) collision and interference problem avoiding enhancement, PDSCH initial symbol alignment receiving enhancement, and CSI-RS collision and interference avoiding enhancement of zero power and non-zero power. The CRS collision and interference problem avoiding enhancement, the PDSCH initial symbol alignment receiving enhancement, and the CSI-RS collision and interference avoiding enhancement of zero power and non-zero power all belong to the scope of rate matching and are collectively known as interference avoiding methods, and particularly, rate matching processing or interference compression processing can be performed according to the informed signaling, the main reason thereof lies in: in an added scenario of R11 release, in particular Scenario1-3, as different nodes have different cell identification, the CRS locations of different nodes are thus different and the sequences of different nodes are also different. In such a case, if JT (Joint Transmission) is performed among different nodes, then resource merging of the different nodes cannot be aligned, and if data mapping is performed independently according to the configuration of the CRS, the PDSCH initial symbol or zero power CSI-RS of each cell, the different resource locations of muting will result in data merging error, and if it is merged according to the main service node, it results in both wasting of resources and introducing the interference to data from the CRS of other nodes at the same time. In addition, in terms of DPS (Dynamic Point Selection), as different subframes will be sent to the UE by different nodes, and if the data is sent according to the main service node, it also has the problem of wasting resources and introducing the interference to the data from the CRS; and if it is considered to use the zero power CSI-RS to measure the interference, then more zero power CSI-RSs need to be configured, and if the UE configured at the zero power CSI-RS subframe of one node cannot realize the existence of the zero power CSI-RS, it may have a remarkable impact on such a UE.

In view of the above-mentioned problems, in order to realize that the different nodes perform coordinated transmission (including: JT, CS/CB (Coordinated Scheduling/Coordinated Beamforming) and DPS (Dynamic Point Selection)) on one UE, non-alignment of the CRS and PDSCH start locations of different nodes and the impact of the CSI-RS on data demodulation performance should be avoided.

SUMMARY

Disclosed are a method and device for processing and indicating downlink data, to at least solve the above-mentioned problems.

According to an aspect of the disclosure, a method for processing the downlink data is provided, including: a user equipment (UE) receiving multiple sets of resource indication information configured for the UE by a base station and transmitted by the base station via a high-layer signaling; the UE receiving a subframe transmitted by the base station, and acquiring downlink grant indication information in the subframe; the UE selecting, from the multiple sets of resource indication information, the resource indication information matching the downlink grant indication information, wherein the resource indication information is used for indicating a resource location having interference present, or, the resource location having interference present and interference information corresponding to the resource location; and the UE processing the interference of the downlink data transmitted on the resource location to the UE.

Preferably, the downlink grant indication information includes at least one of: antenna port indication information, new data indication information of an invalid transmission block, scrambling sequence indication information, an aggregation level of downlink grant control information, a location of the first control channel element (CCE) of the downlink grant control information, one or more preset bits, a subframe number of a subframe where the downlink grant control information is located, and a system frame number of a system frame where the downlink grant control information is located.

Preferably, the UE receiving the multiple sets of resource indication information configured for the UE by the base station and transmitted by the base station via the high-layer signaling includes: the UE receiving the multiple sets of resource indication information configured for the UE by the base station via a UE-specific high-layer signaling; and the UE receiving the subframe transmitted by the base station includes: the UE receiving downlink grant information carried in a physical downlink control channel (PDCCH) area or an enhance physical downlink control channel (EPDCCH) area on the subframe and transmitted by the base station, wherein the downlink grant information is used for indicating that the subframe carries downlink data corresponding to the UE.

Preferably, the UE acquiring the downlink grant indication information in the subframe includes: the UE blindly detecting the subframe and parsing out the downlink grant information; and blindly detecting the downlink data corresponding to the UE indicated by the downlink grant information and acquiring the downlink grant indication information.

Preferably, when the resource indication information is used for indicating the resource location having interference present, the UE processing the interference of the downlink data transmitted on the resource location to the UE includes: prohibiting the UE from receiving the downlink data on the resource location; or, the UE acquiring that the base station does not map data on resources corresponding to the resource location, wherein not mapping data includes: not mapping physical downlink shared channel data; or, after acquiring that the base station does not map data on the resource corresponding to the resource location, the UE performing rate matching on the resource location, wherein not mapping data includes: not mapping physical downlink shared channel data.

Preferably, the resource location includes at least one of: a start location of OFDM symbol of the physical downlink shared channel (PDSCH) in a time domain, multicast broadcast single frequency network (MBSFN) subframe configuration information corresponding to the resource location, cell-specific reference signal (CRS) configuration information, zero power CSI-RS configuration information, non-zero power CSI-RS configuration information, cycle and subframe offset of the zero power CSI-RS and cycle and subframe offset of the non-zero power CSI-RS.

Preferably, when the resource indication information is used for indicating the resource location having interference present and the interference information corresponding to the resource location, the UE processing the interference of the downlink data transmitted on the resource location to the UE includes: the UE receiving the downlink data at the resource location; and the UE performing interference cancellation on the downlink data according to the interference information corresponding to the resource location.

Preferably, the resource location having interference present and the interference information corresponding to the resource location include at least one of: cell-specific reference signal (CRS) configuration information, zero power CSI-RS configuration information or non-zero power CSI-RS configuration information, a start location of a physical downlink shared channel (PDSCH), multicast broadcast single frequency network (MBSFN) subframe configuration information corresponding to the resource location.

Preferably, the CRS configuration information includes at least one of: the number of ports of CRS, cell identification corresponding to the CRS and sending power of the CRS; the zero power CSI-RS configuration information includes at least one of: a resource location of a zero power CSI-RS, the number of resource elements of the zero power CSI-RS and a cycle and subframe offset of the zero power CSI-RS; and the non-zero power CSI-RS configuration information includes at least one of: the number of ports of non-zero power CSI-RS, a resource location of the non-zero power CSI-RS and a cycle and subframe offset of the non-zero power CSI-RS.

According to another aspect of the disclosure, an indicating method for processing downlink data is provided, including: a base station sending, to a user equipment (UE) via a high-layer signaling, multiple sets of resource indication information configured for the UE by the base station; the base station sending downlink subframe carrying downlink grant indication information to the UE; and after the UE selects, from the multiple sets of resource indication information, the resource indication information matching the downlink grant indication information, the base station indicating the UE to process interference of downlink data according to the resource indication information, wherein the resource indication information is used for indicating a resource location having interference present, or, the resource location having interference present and interference information corresponding to the resource location.

Preferably, the downlink grant indication information includes at least one of: antenna port indication information, new data indication information of an invalid transmission block, scrambling sequence indication information, an aggregation level of downlink grant control information, a location of the first control channel element (CCE) of the downlink grant control information, one or more preset bits, a subframe number of a subframe where the downlink grant control information is located, and a system frame number of a system frame where the downlink grant control information is located.

Preferably, the base station sending, to the UE via the high-layer signaling, the multiple sets of resource indication information configured for the UE by the base station includes: the base station sending, to the UE via a UE-specific high-layer signaling, the multiple sets of resource indication information configured for the UE; and the base station sending the downlink subframe carrying the downlink grant indication information to the UE includes: the base station carrying downlink grant information in a physical downlink control channel (PDCCH) area or an enhance physical downlink control channel (EPDCCH) area on the subframe, and sending the subframe to the UE, wherein the downlink grant information is used for indicating that the subframe carries downlink data corresponding to the UE.

Preferably, when the resource indication information is used for indicating the resource location having interference present, the base station indicating the UE to process the interference of the downlink data according to the resource indication information includes: the base station indicating the UE to prohibit the UE from receiving the downlink data on the resource location; or, the base station informing the UE that the base station does not map data on the resource corresponding to the resource location, wherein not mapping data includes: not mapping physical downlink shared channel data; or, after informing the UE that the base station does not map data on the resource corresponding to the resource location, the base station indicating the UE to perform rate matching on the resource location, wherein not mapping data includes: not mapping physical downlink shared channel data.

Preferably, the resource location includes at least one of: a start location of OFDM symbol of the physical downlink shared channel (PDSCH) in a time domain, multicast broadcast single frequency network (MBSFN) subframe configuration information corresponding to the resource location, cell-specific reference signal (CRS) configuration information, zero power CSI-RS configuration information, non-zero power CSI-RS configuration information, cycle and subframe offset of the zero power CSI-RS and cycle and subframe offset of the non-zero power CSI-RS.

Preferably, when the resource indication information is used for indicating the resource location having interference present and the interference information corresponding to the resource location, the base station indicating the UE to process on the resource location the interference of the downlink data transmitted to the UE includes: the base station indicating the UE to receive the downlink data at the resource location; and the base station indicating the UE to perform interference cancellation on the downlink data according to the interference information corresponding to the resource location.

Preferably, the resource location having interference present and interference information corresponding to the resource location include at least one of: cell-specific reference signal (CRS) configuration information, zero power channel state information reference signal (CSI-RS) configuration information, non-zero power CSI-RS configuration information, start location of OFDM symbol of a physical downlink shared channel (PDSCH) in a time domain and multicast broadcast single frequency network (MBSFN) subframe configuration information corresponding to the resource location.

Preferably, the CRS configuration information includes at least one of: the number of ports of CRS, cell identification corresponding to the CRS and sending power of the CRS; the zero power CSI-RS configuration information includes at least one of a resource location of a zero power CSI-RS, the number of resource elements of the zero power CSI-RS and a cycle and subframe offset of the zero power CSI-RS; and the non-zero power CSI-RS configuration information includes at least one of: the number of ports of non-zero power CSI-RS, a resource location of the non-zero power CSI-RS and a cycle and subframe offset of the non-zero power CSI-RS.

According to still another aspect of the disclosure, a device for processing downlink data, located at a user equipment (UE), is provided, and the device includes: a receiving module configured to receive multiple sets of resource indication information configured for the UE by a base station and transmitted by the base station via a high-layer signaling; an acquiring module configured to receive a subframe transmitted by the base station, and acquire downlink grant indication information in the subframe; a selection module configured to select from the multiple sets of resource indication information the resource indication information matching the downlink grant indication information, wherein the resource indication information is used for indicating a resource location having interference present, or, the resource location having interference present and interference information corresponding to the resource location; and a processing module configured to process on the resource location the interference of downlink data transmitted to the UE.

Preferably, the downlink grant control information includes at least one of: antenna port indication information, new data indication information of an invalid transmission block, scrambling sequence indication information, an aggregation level of downlink grant control information, a location of the first control channel element (CCE) of the downlink grant control information and one or more preset bits.

Preferably, the acquiring module includes: a parsing unit configured to blindly detect the subframe and parse out downlink grant information; and an acquiring unit configured to blindly detect downlink data corresponding to the UE indicated by the downlink grant information and acquire the downlink grant indication information.

Preferably, when the resource indication information is used for indicating the resource location having interference present, the processing module prohibits the UE from receiving the downlink data on the resource location; or, the processing module acquires that the base station does not map data on the resource corresponding to the resource location, wherein not mapping data includes: not mapping physical downlink shared channel data; or, after acquiring that the base station does not map data on the resource corresponding to the resource location, the processing module performs rate matching on the resource location, wherein not mapping data includes: not mapping physical downlink shared channel data.

Preferably, the resource location includes at least one of: the start location of OFDM symbol of a physical downlink shared channel (PDSCH) in a time domain, multicast broadcast single frequency network (MBSFN) subframe configuration information corresponding to the resource location, cell-specific reference signal (CRS) configuration information, zero power CSI-RS configuration information, non-zero power CSI-RS configuration information, cycle and subframe offset of the zero power CSI-RS and cycle and subframe offset of the non-zero power CSI-RS.

Preferably, when the resource indication information is used for indicating the resource location having interference present and interference information corresponding to the resource location, the processing module receives the downlink data at the resource location and performs interference cancellation on the downlink data according to the interference information corresponding to the resource location.

Preferably, the resource location having interference present and interference information corresponding to the resource location include at least one of: location information of a resource element needing interference cancellation, cell-specific reference signal (CRS) configuration information, zero power channel state information reference signal (CSI-RS) configuration information, non-zero power CSI-RS configuration information, a start location of OFDM symbol of a physical downlink shared channel (PDSCH) in a time domain and multicast broadcast single frequency network (MBSFN) subframe configuration information corresponding to the resource location.

Preferably, the CRS configuration information includes at least one of: the number of ports of CRS, cell identification corresponding to the CRS and sending power of the CRS; the zero power CSI-RS configuration information includes at least one of: a resource location of a zero power CSI-RS, the number of resource elements of the zero power CSI-RS and a cycle and subframe offset of the zero power CSI-RS; and the non-zero power CSI-RS configuration information includes at least one of: the number of ports of non-zero power CSI-RS, the resource location of the non-zero power CSI-RS and the cycle and subframe offset of the non-zero power CSI-RS.

According to still another aspect of the disclosure, an indicating device for processing downlink data, located at a base station, is provided, and the device includes: a configuring module configured to configure multiple types of resource indication information for a user equipment (UE) via a UE-specific high-layer signaling; a sending module configured to send downlink subframe carrying downlink grant indication information to the UE; and an indicating module configured to, after the UE selects, from the multiple sets of resource indication information, the resource indication information matching the downlink grant indication information, indicate the UE to process the interference of downlink data according to the resource indication information, wherein the resource indication information is used for indicating a resource location having interference present, or, the resource location having interference present and interference information corresponding to the resource location.

Preferably, the downlink grant indication information includes at least one of: antenna port indication information, new data indication information of an invalid transmission block, scrambling sequence indication information, an aggregation level of downlink grant control information, a location of the first control channel element (CCE) of the downlink grant control information, one or more preset bits, a subframe number of a subframe where the downlink grant control information is located, and a system frame number of a system frame where the downlink grant control information is located.

Preferably, the sending module includes: a sending unit configured to carry downlink grant information in a physical downlink control channel (PDCCH) area or an enhance physical downlink control channel (EPDCCH) area on the subframe, and send the subframe to the UE, wherein the downlink grant information is used for indicating that the subframe carries downlink data corresponding to the UE.

Preferably, the resource location includes at least one of: the start location of OFDM symbol of a physical downlink shared channel (PDSCH) in a time domain, multicast broadcast single frequency network (MBSFN) subframe configuration information corresponding to the resource location, cell-specific reference signal (CRS) configuration information, zero power CSI-RS configuration information, non-zero power CSI-RS configuration information, cycle and subframe offset configuration of the zero power CSI-RS and cycle and subframe offset configuration of the non-zero power CSI-RS.

Preferably, the resource location having interference present and interference information corresponding to the resource location include at least one of: cell-specific reference signal (CRS) configuration information, zero power channel state information reference signal (CSI-RS) configuration information or non-zero power CSI-RS configuration information, a start location of OFDM symbol of a physical downlink shared channel (PDSCH) in a time domain and multicast broadcast single frequency network (MBSFN) subframe configuration information corresponding to the resource location.

Preferably, the CRS configuration information at least includes one of: the number of ports of CRS, cell identification corresponding to the CRS and sending power of the CRS; the zero power CSI-RS configuration information includes at least one of: a resource location of a zero power CSI-RS, the number of resource elements of the zero power CSI-RS and a cycle and subframe offset of the zero power CSI-RS; and the non-zero power CSI-RS configuration information includes at least one of: the number of ports of non-zero power CSI-RS, a resource location of the non-zero power CSI-RS and a cycle and subframe offset of the non-zero power CSI-RS.

By virtue of the disclosure, the UE performs interference avoiding or interference cancellation on the downlink data transmitted to the UE according to the downlink grant control information in the subframe received by the UE and according to the downlink grant control information, which solves the problem of the non-alignment of CRS and PDSCH start locations of different nodes and the impact of the CSI-RS on data demodulation performance, the disclosure allows the implementation of coordinated transmission (including: joint transmission, joint scheduling, joint beam-forming, and dynamic node selection) among different nodes to one UE, thus achieving the effects of reduction in resource wastage, and prevention of interference to data demodulation from a control domain or a pilot frequency.

BRIEF DESCRIPTION OF THE DRAWINGS

Drawings, provided for further understanding of the disclosure and forming a part of the specification, are used to explain the disclosure together with embodiments of the disclosure rather than to limit the disclosure. In the drawings.

DETAILED DESCRIPTION OF THE EMBODIMENTS

The disclosure is described below with reference to the accompanying drawings and embodiments in detail. Note that, the embodiments of the disclosure and the features of the embodiments can be combined with each other if there is no conflict.

Figure 1:
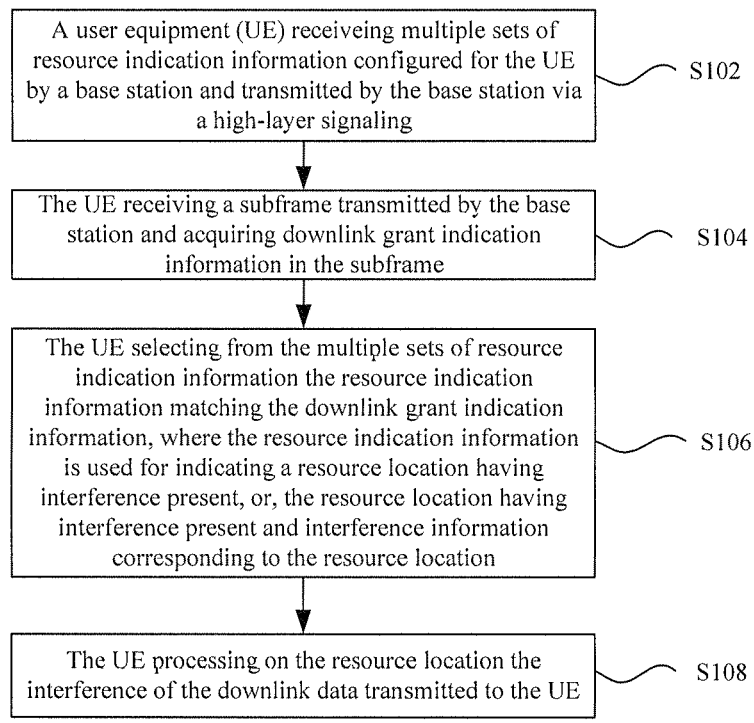
FIG. 1 is a flow diagram of a method for processing downlink data according to an embodiment of the disclosure.

FIG. 1 is a flow diagram of a method for processing downlink data according to an embodiment of the disclosure. As shown in FIG. 1, the method mainly includes the following steps (Step S102-Step S108):

Step S102, a user equipment (UE) receives multiple sets of resource indication information configured for the UE by a base station and transmitted by the base station via a high-layer signaling.

Step S104, the UE receives a subframe transmitted by the base station, and acquires downlink grant indication information in the subframe.

Step S106, the UE selects from the multiple sets of resource indication information the resource indication information matching the downlink grant indication information, wherein the resource indication information is used for indicating a resource location having interference present, or, the resource location having interference present and interference information corresponding to the resource location.

Step S108, the UE processes on the resource location the interference of the downlink data transmitted to the UE.

In a preferred embodiment of the disclosure, the downlink grant control information includes at least one of: antenna port indication information, new data indication information of an invalid transmission block, scrambling sequence indication information, an aggregation level of downlink grant control information, a location of the first control channel element (CCE) of the downlink grant control information, one or more preset bits, a subframe number of a subframe where the downlink grant control information is located, and a system frame number of a system frame where the downlink grant control information is located.

In a practical application, the downlink grant control information may include one or more of: DCI (Downlink Control Information) format 1, DCI format 1a, DCI format 1b, DCI format 1c, DCI format 1d, DCI format 2, DCI format 2a, DCI format 2b, DCI format 2c and the downlink grant control information control format of a later release. The antenna port indication information may include the antenna port indication relevant information in one or more of: DCI format 2b, DCI format 2c and the downlink grant control information control format of a later release. The new data indication information of an invalid transmission block may include the new data indication relevant information of one or more of: DCI format 2b, DCI format 2c and the downlink grant control information control format of a later release. The PDCCH and the aggregation level in the UE-specific search space may include one or more of the UE-specific search space and the aggregation level of one or more of: DCI format 1, DCI format 1a, DCI format 1b, DCI format 1c, DCI format 1d, DCI format 2, DCI format 2a, DCI format 2b, DCI format 2c and the downlink grant control information control format of a later release. The subframe number where the downlink grant control information is located may include the subframe number of the subframe of one or more of: DCI format 1, DCI format 1a, DCI format 1b, DCI format 1c, DCI format 1d, DCI format 2, DCI format 2a, DCI format 2b, DCI format 2c and the downlink grant control information control format of a later release.

In a preferred embodiment of the disclosure, Step S102 may be implemented in this way: the UE receiving the multiple sets of resource indication information configured for the UE by the base station via a UE-specific high-layer signaling. In Step S102, the UE receiving the subframe transmitted by the base station includes: the base station carrying the downlink grant information in a physical downlink control channel (PDCCH) area or an enhance physical downlink control channel (EPDCCH) area on the subframe, and sending the subframe to the UE, wherein the downlink grant information is used for indicating that the subframe carries downlink data corresponding to the UE.

In Step S104, acquiring the downlink grant indication information in the subframe includes: the UE blindly detecting the subframe and parsing out the downlink grant information; and blindly detecting the downlink data corresponding to the UE indicated by the downlink grant information and acquiring the downlink grant indication information.

In a preferred embodiment of the disclosure, when the resource indication information is used for indicating a resource location having interference present, the UE processing the interference of the downlink data transmitted on the resource location to the UE includes: prohibiting the UE from receiving the downlink data on the resource location; or the UE acquiring that the base station does not map data on resources corresponding to the resource location, wherein not mapping data includes: not mapping physical downlink shared channel data; or after acquiring that the base station does not map data on the resource corresponding to the resource location, the UE performing rate matching on the resource location, wherein not mapping data includes: not mapping physical downlink shared channel data.

In a practical application, the resource location may include at least one of: a start location of OFDM symbol of the physical downlink shared channel (PDSCH) in a time domain, multicast broadcast single frequency network (MB-SFN) subframe configuration information corresponding to the resource location, the port number of cell-specific reference signal (CRS), zero power CSI-RS configuration information, non-zero power CSI-RS configuration information, cycle and subframe offset of the zero power CSI-RS and cycle and subframe offset of the non-zero power CSI-RS.

In a preferred embodiment of the disclosure, when the resource indication information is used for indicating the resource location having interference present and interference information corresponding to the resource location, the UE processing the interference of the downlink data transmitted on the resource location to the UE includes: the UE receiving the downlink data at the resource location; and the UE performing interference cancellation on the downlink data according to the interference information corresponding to the resource location.

In a practical application, the resource location having interference present and interference information corresponding to the resource location include at least one of cell-specific reference signal (CRS) configuration information, zero power channel state information reference signal (CSI-RS) or non-zero power CSI-RS configuration information, a start location of a physical downlink shared channel (PDSCH) and multicast broadcast single frequency network (MBSFN) subframe configuration information corresponding to the resource location.

Preferably, the CRS configuration information includes at least one of: the number of ports of CRS, cell identification corresponding to the CRS and sending power of the CRS; the zero power CSI-RS configuration information includes at least one of: a resource location of a zero power CSI-RS, the number of resource elements of the zero power CSI-RS and a cycle and subframe offset of the zero power CSI-RS; and the non-zero power CSI-RS configuration information includes at least one of: the number of ports of non-zero power CSI-RS, the resource location of the non-zero power CSI-RS and the cycle and subframe offset of the non-zero power CSI-RS.

Figure 2:
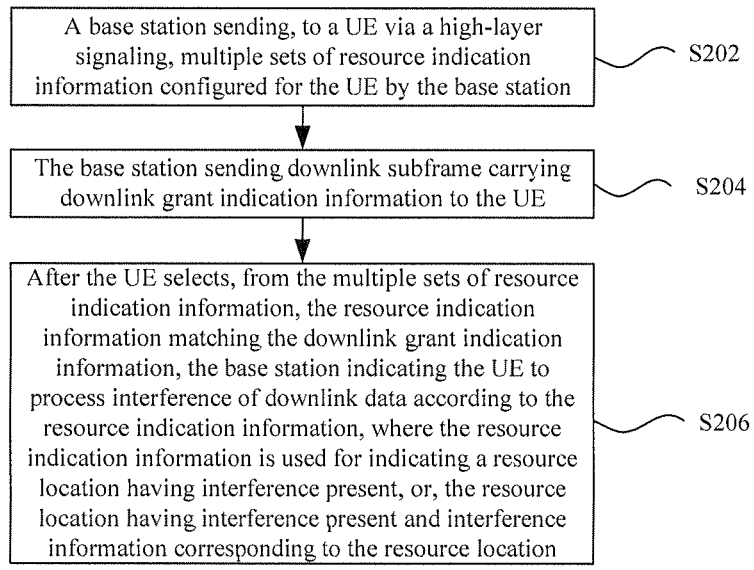
FIG. 2 is a flow diagram of a method for processing and indicating downlink data according to an embodiment of the disclosure.

FIG. 2 is a flow diagram of a method for processing and indicating downlink data according to an embodiment of the disclosure. As shown in FIG. 2, the method mainly includes the following steps (Step S202-Step S206):

Step S202, a base station sends, to a user equipment (UE) via a high-layer signaling, multiple sets of resource indication information configured for the UE by the base station.

Step S204, the base station sends downlink subframe carrying downlink grant indication information to the UE.

Step S206, after the UE selects, from the multiple sets of resource indication information, the resource indication information matching the downlink grant indication information, the base station indicates the UE to perform interference-processing on downlink data according to the resource indication information, wherein the resource indication information is used for indicating a resource location having interference present, or, the resource location having interference present and interference information corresponding to the resource location.

In a preferred embodiment of the disclosure, the downlink grant indication information includes at least one of: antenna port indication information, new data indication information of an invalid transmission block, scrambling sequence indication information, an aggregation level of downlink grant control information, a location of the first control channel element (CCE) of the downlink grant control information, one or more preset bits, a subframe number of a subframe where the downlink grant control information is located, and a system frame number of a system frame where the downlink grant control information is located.

In a preferred embodiment of the disclosure, Step S202 may be implemented in this way: the base station sending the multiple sets of resource indication information configured for the UE to the UE via a UE-specific high-layer signaling; and Step S204 may be implemented in this way: the base station carrying the downlink grant information in a physical downlink control channel (PDCCH) area or an enhance physical downlink control channel (EPDCCH) area on the subframe, and sending the subframe to the UE, wherein the downlink grant information is used for indicating that the subframe carries downlink data corresponding to the UE.

In a preferred embodiment of the disclosure, when the resource indication information is used for indicating a resource location having interference present, the process of the base station indicating the UE to process the interference of downlink data according to the resource indication information can be implemented in this way: the base station indicating the UE to prohibit the UE from receiving the downlink data on the resource location; or the base station informing the UE that the base station does not map data on the resource corresponding to the resource location, wherein not mapping data includes: not mapping physical downlink shared channel data; or after informing the UE that the base station does not map data on the resource corresponding to the resource location, the base station indicating the UE to perform rate matching on the resource location, wherein not mapping data includes: not mapping physical downlink shared channel data.

In a practical application, the resource location includes at least one of: a start location of OFDM symbol of the physical downlink shared channel (PDSCH) in a time domain, multicast broadcast single frequency network (MB-SFN) subframe configuration information corresponding to the resource location, cell-specific reference signal (CRS) configuration information, zero power CSI-RS configuration information, non-zero power CSI-RS configuration information, cycle and subframe offset of the zero power CSI-RS and cycle and subframe offset of the non-zero power CSI-RS.

In a preferred embodiment of the disclosure, when the resource indication information is used for indicating the resource location having interference present and interference information corresponding to the resource location, the process of the base station indicating the UE to process on the resource location the interference of downlink data transmitted to the UE can be implemented in this way: the base station indicating the UE to receive the downlink data at the resource location; and the base station indicating the UE to perform interference cancellation on the downlink data according to the interference information corresponding to the resource location.

In a practical application, the resource location having interference present and interference information corresponding to the resource location include at least one of: cell-specific reference signal (CRS) configuration information, zero power channel state information reference signal (CSI-RS) configuration information, non-zero power CSI-RS configuration information, the start location of OFDM symbol of a physical downlink shared channel (PDSCH) in a time domain and multicast broadcast single frequency network (MBSFN) subframe configuration information corresponding to the resource location.

In a practical application, the CRS configuration information includes at least one of: the number of ports of CRS, cell identification corresponding to the CRS and sending power of the CRS; the zero power CSI-RS configuration information includes at least one of: a resource location of a zero power CSI-RS, the number of resource elements of the zero power CSI-RS and a cycle and subframe offset of the zero power CSI-RS; and the non-zero power CSI-RS configuration information includes at least one of: the number of ports of non-zero power CSI-RS, the resource location of the non-zero power CSI-RS and the cycle and subframe offset of the non-zero power CSI-RS.

The above-mentioned downlink data processing method and downlink data processing and indicating method will be described in details with reference to preferred embodiments below, and in the following description, in order to make it convenient, the above-mentioned resource location having interference present is abbreviated as the resource location, and the above-mentioned resource location and interference information corresponding to the resource location is called the resource location and the interference information of the corresponding location.

Preferred Embodiment 1

UE1 is assumed to be a user of R11, the base station side configures multiple sets of resource locations (or the resource location and the interference information of the corresponding location) for the UE1 via a high-layer signaling, and then sends DL_Grant (i.e. downlink grant) information in the PDCCH area or the EPDCCH area on the subframe on which the downlink service of the UE1 needs to be scheduled, so as to indicate that there is downlink data for the UE1 in the current subframe, the UE1 performs blind detection on the subframe so as to obtain the DL_Grant, and then the UE1 obtains the antenna port indication information in DCI (Downlink Control Information) Format 2C by means of blind detection according to the indication information (which presents in the form of bit data in a practical application, and these bit data are used for indicating the formats of the downlink grant control information) in the DL_Grant, so as to determine which set of the multiple sets of resource locations (or the resource location and the interference information of the corresponding location) configured by the base station is used. For example, the UE1 acquires from the DL_Grant according to blind detection that during one-layer transmission, the antenna port of an valid TB (transmission block) is port 7 and the scrambling sequence indication information $N_{SCID}=0$, then a first resource location (or the resource location and the interference information of the corresponding location) is selected; when the antenna port of the valid TB is port 8 and the scrambling sequence indication information is $N_{SCID}=0$, a second resource location (or the resource location and the interference information of the corresponding location) is selected; when the antenna port of the valid TB is port 7 and the scrambling sequence indication information is $N_{SCID}=1$, a third resource location (or the resource location and the interference information of the corresponding location) is selected; and when the antenna port of the valid TB is port 8 and the scrambling sequence indication information is $N_{SCID}=1$, a fourth resource location (or the resource location and the interference information of the corresponding location) is selected. After obtaining the resource location, the UE can control not to receive the downlink data on the resource location by means of using the rate matching, or after obtaining the resource location and the interference information of the corresponding location, the UE receives the downlink data on the resource location, and then performs interference cancellation on the corresponding resource (i.e. the resource on which interference is generated) on the subframe by means of using the interference information of the corresponding location.

Preferred Embodiment 2

UE1 is assumed to be a user of R11, the base station side configures multiple sets of resource locations (or the resource location and the interference information of the corresponding location) for the UE1 via a high-layer signaling, and then sends DL_Grant information in the PDCCH area or the EPDCCH area on the subframe on which the downlink service of the UE1 needs to be scheduled, so as to indicate that there is downlink data for the UE1 in the current subframe, and the UE1 performs blind detection on the subframe so as to obtain the indication information in the DL_Grant. Then the UE1 obtains new data indication information in Disable TB block in the DCI Format 2C by means of blind detection so as to determine which set of the multiple sets of resource locations (or the resource location and the interference information of the corresponding location) configured by the base station is used. For example, the UE1 obtains from the DL_Grant according to blind detection that during one-layer transmission, the new data indication information of invalid TB, i.e., NDI=0, then a first resource location (or the resource location and the interference information of the corresponding location) is selected; and when the UE1 obtains one-layer transmission in the DL_Grant and the new data indication information of the invalid TB, i.e., NDI=1 according to blind detection, a second resource location (or the resource location and the interference information of the corresponding location) is selected. After obtaining the resource location and the interference information of the corresponding location, the UE can control not to receive the downlink data on the corresponding resource location by means of using the rate matching, or, to receive the downlink data on the corresponding resource and perform interference cancellation on the corresponding resource by means of using the corresponding interference information.

Preferred Embodiment 3

UE1 is assumed to be a user of R11, the base station side configures multiple sets of resource locations (or the resource location and the interference information of the corresponding location) for the UE1 via a high-layer signaling, and then sends DL_Grant information in the PDCCH area or the EPDCCH area on the subframe on which the downlink service of the UE1 needs to be scheduled, so as to indicate that there is downlink data for the UE1 in the current subframe, and the UE1 performs blind detection on the subframe so as to obtain the indication information in the DL_Grant. Then the UE1 obtains the new data indication information and the antenna port indication information in Disable TB block in the DCI Format 2C by means of blind detection so as to determine which set of the multiple sets of resource locations (or the resource location and the interference information of the corresponding location) configured by the base station is used. For example, the UE1 obtains from the DL_Grant according to blind detection that during one-layer transmission, when the new data indication information of invalid TB NDI=0 and the antenna port of the valid TB is port 7, a first set of resource locations (or the resource location and the interference information of the corresponding location) is selected; when the UE1 obtains one-layer transmission in the DL_Grant and the new data indication information of invalid TB NDI=0 and the antenna port of the valid TB is port 8 according to blind detection, a second set of resource locations (or the resource location and the interference information of the corresponding location) is selected; when the UE1 obtains one-layer transmission in the DL_Grant and the new data indication information of invalid TB NDI=1 and the antenna port of the valid TB is port 7 according to blind detection, a third set of resource locations (or the resource location and the interference information of the corresponding location) is selected; and when the UE1 obtains one-layer transmission in the DL_Grant and the new data indication information of invalid TB NDI=1 and the antenna port of the valid TB is port 8 according to blind detection, a fourth set of resource locations (or the resource location and the interference information of the corresponding location) is selected. After obtaining the resource location and the interference information of the corresponding location, the UE can control not to receive the downlink data on the corresponding resource location by means of using the rate matching, or, to receive the downlink data on the corresponding resource, and perform interference cancellation on the corresponding resource by means of using the corresponding interference information.

Preferred Embodiment 4

UE1 is assumed to be a user of R11, the base station side configures multiple sets of resource locations (or the resource location and the interference information of the corresponding location) for the UE1 via a high-layer signaling, and then sends DL_Grant information in the PDCCH area or the EPDCCH area on the subframe on which the downlink service of the UE1 needs to be scheduled, so as to indicate that there is downlink data for the UE1 in the current subframe, and the UE1 performs blind detection on the subframe so as to obtain the indication information in the DL_Grant. Then the UE1 obtains the new data indication information and the scrambling sequence indication information $N_{SCID}$ in Disable TB block in the DCI Format 2C by means of blind detection so as to determine which set of the multiple sets of resource locations (or the resource location and the interference information of the corresponding location) configured by the base station is used. For example, when the UE1 obtains one-layer transmission in the DL_Grant and the new data indication information of the invalid TB NDI=0 and that of the valid TB $N_{SCID}$=0 according to blind detection, a first set of resource locations (or the resource location and the interference information of the corresponding location) is selected; when the UE1 obtains one-layer transmission in the DL_Grant and the new data indication information of the invalid TB NDI=0 and that of the valid TB $N_{SCID}$=1 according to blind detection, a second set of resource locations (or the resource location and the interference information of the corresponding location) is selected; when the UE1 obtains one-layer transmission in the DL_Grant and the new data indication information of the invalid TB NDI=1 and that of the valid TB $N_{SCID}$=0 according to blind detection, a third set of resource locations (or the resource location and the interference information of the corresponding location) is selected; and when the UE1 obtains one-layer transmission in the DL_Grant and the new data indication information of the invalid TB NDI=1 and that of the valid TB $N_{SCID}$=1 according to blind detection, a fourth set of resource locations (or the resource location and the interference information of the corresponding location) is selected.

Preferred Embodiment 5

UE1 is assumed to be a user of R11, the base station side configures multiple sets of resource locations (or the resource location and the interference information of the corresponding location) for the UE1 via a high-layer signaling, and then sends DL_Grant information in the PDCCH area or the EPDCCH area on the subframe on which the downlink service of the UE1 needs to be scheduled, so as to indicate that there is downlink data for the UE1 in the current subframe, and the UE1 performs blind detection on the subframe so as to obtain the indication information in the DL_Grant. Then the UE1 obtains the new data indication information and the antenna port indication information and the scrambling sequence indication information $N_{SCID}$ in Disable TB block in the DCI Format 2C by means of blind detection so as to determine which set of the multiple sets of resource locations (or the resource location and the interference information of the corresponding location) configured by the base station is used. UE1 is assumed to be a user of R11, the base station side configures virtual signaling of multiple sets of downlink DMRS for the UE1 via a high-layer signaling, and then sends DL_Grant information in the PDCCH area or the EPDCCH area on the subframe on which the downlink service of the UE1 needs to be scheduled, so as to indicate that there is downlink data for the UE1 in the current subframe, and the UE1 performs blind detection on the subframe so as to obtain the indication information in the DL_Grant. Then the UE1 obtains the new data indication information and the scrambling sequence indication information $N_{SCID}$ in Disable TB block in the DCI Format 2C by means of blind detection so as to determine which set of the multiple sets of resource locations (or the resource location and the interference information of the corresponding location) configured by the base station is used. For example, when the UE1 obtains one-layer transmission in the DL_Grant and the new data indication information of invalid TB NDI=0 and that of the valid TB $N_{SCID}$=0 and the antenna port of the valid TB is port 7 according to blind detection, a first set of resource locations (or the resource location and the interference information of the corresponding location) is selected; when the UE1 obtains one-layer transmission in the DL_Grant and the new data indication information of invalid TB NDI=0 and that of the valid TB $N_{SCID}$=1 and the antenna port of the valid TB is port 7 according to blind detection, a second set of resource locations (or the resource location and the interference information of the corresponding location) is selected; when the UE 1 obtains one-layer transmission in the DL_Grant and the new data indication information of invalid TB NDI=1 and that of the valid TB $N_{SCID}$=0 and the antenna port of the valid TB is port 8 according to blind detection, a third set of resource locations (or the resource location and the interference information of the corresponding location) is selected; and when the UE1 obtains one-layer transmission in the DL_Grant and the new data indication information of invalid TB NDI=1 and that of the valid TB $N_{SCID}$=1 and the antenna port of the valid TB is port 8 according to blind detection, a fourth set of resource locations (or the resource location and the interference information of the corresponding location) is selected.

Preferred Embodiment 6

UE1 is assumed to be a user of R11, the base station side configures multiple sets of resource locations (or the resource location and the interference information of the corresponding location) for the UE1 via a high-layer signaling, and then sends DL_Grant information in the PDCCH area or the EPDCCH area on the subframe on which the downlink service of the UE1 needs to be scheduled, so as to indicate that there is downlink data for the UE1 in the current subframe, and the UE1 performs blind detection on the subframe so as to obtain the indication information in the DL_Grant. Then the UE1 obtains the location of the first CCE placed the DL_Grant according to blind detection so as to determine using the multiple sets of resource locations (or the resource location and the interference information of the corresponding location) configured by the base station. For example, when the UE1 detects the aggregation level of the DL_Grant L=1 and the location of the first CCE nCCE, offset=0/2/4, or L=2 and nCCE, offset=0/4/8, or L=4 and nCCE, offset=0, or L=8 and nCCE, offset=0, a first set of resource locations (or the resource location and the interference information of the corresponding location) is selected; and when L=1 and nCCE, offset=1/3/5, or L=2 and nCCE, offset=2/6/10, or L=4 and nCCE, offset=4, or L=8 and nCCE, offset=8, a second set of resource locations (or the resource location and the interference information of the corresponding location) is selected.

Preferred Embodiment 7

UE1 is assumed to be a user of R11, the base station side configures multiple sets of resource locations (or the resource location and the interference information of the corresponding location) for the UE1 via a high-layer signaling, and then sends DL_Grant information in the PDCCH area or the EPDCCH area on the subframe on which the downlink service of the UE1 needs to be scheduled, so as to indicate that there is downlink data for the UE1 in the current subframe, and the UE1 performs blind detection on the subframe so as to obtain the indication information in the DL_Grant. Then the UE1 obtains the location of the first CCE placed the DL_Grant and the aggregation level according to blind detection so as to determine which set of the multiple sets of resource locations (or the resource location and the interference information of the corresponding location) configured by the base station is used. For example, when the UE1 detects the aggregation level of the DL_Grant L=1 and nCCE, offset=0/2/4, or L=2 and nCCE, offset=0/4/8, a first set of resource locations (or the resource location and the interference information of the corresponding location) is selected; when L=4 and nCCE, offset=0, or L=8 and nCCE, offset=0, a second set of resource locations (or the resource location and the interference information of the corresponding location) is selected; and when L=1 and nCCE, offset=1/3/5, or L=2 and nCCE, offset=2/6/10, a third set of resource locations (or the resource location and the interference information of the corresponding location) is selected; and when L=4 and nCCE, offset=4, or L=8 and nCCE, offset=8, a fourth set of resource locations (or the resource location and the interference information of the corresponding location) is selected.

Preferred Embodiment 8

UE1 is assumed to be a user of R11, the base station side configures multiple sets of resource locations (or the resource location and the interference information of the corresponding location) for the UE1 via a high-layer signaling, and then sends DL_Grant information in the PDCCH area or the EPDCCH area on the subframe on which the downlink service of the UE1 needs to be scheduled, so as to indicate that there is downlink data for the UE1 in the current subframe, and the UE1 performs blind detection on the subframe so as to obtain the indication information in the DL_Grant. Then the UE1 obtains the location of the first CCE placed the DL_Grant and a newly increased 1 bit indicating a resource location and interference information in the detected DCI according to blind detection so as to determine which set of the multiple sets of resource locations (or the resource location and the interference information of the corresponding location) configured by the base station is used. For example, when the UE1 detects the aggregation level of the DL_Grant L=1 and the location of the first CCE nCCE, offset=0/2/4, or L=2 and nCCE, offset=0/4/8, or L=4 and nCCE, offset=0, or L=8 and nCCE, offset=0, and the newly increased 1 bit indicating as 0, a first set of resource locations (or the resource location and the interference information of the corresponding location) is selected; and when L=1 and nCCE, offset=1/3/5, or L=2 and nCCE, offset=2/6/10, or L=4 and nCCE, offset=4, or L=8 and nCCE, offset=8, and the newly increased 1 bit indicating as 0, a second set of resource locations (or the resource location and the interference information of the corresponding location) is selected. When the UE1 detects the aggregation level of the DL_Grant L=1 and the location of the first CCE nCCE, offset=0/2/4, or L=2 and nCCE, offset=0/4/8, or L=4 and nCCE, offset=0, or L=8 and nCCE, offset=0, and the newly increased 1 bit indicating as 1, a third set of resource locations (or the resource location and the interference information of the corresponding location) is selected; and when L=1 and nCCE, offset=1/3/5, or L=2 and nCCE, offset=2/6/10, or L=4 and nCCE, offset=4, or L=8 and nCCE, offset=8, and the newly increased 1 bit indicating as 1, a fourth set of resource locations (or the resource location and the interference information of the corresponding location) is selected.

Preferred Embodiment 9

UE1 is assumed to be a user of R11, the base station side configures multiple sets of resource locations (or the resource location and the interference information of the corresponding location) for the UE1 via a high-layer signaling, and then sends DL_Grant information in the PDCCH area or the EPDCCH area on the subframe on which the downlink service of the UE1 needs to be scheduled, so as to indicate that there is downlink data for the UE1 in the current subframe, and the UE1 performs blind detection on the subframe so as to obtain the indication information in the DL_Grant. Then the UE1 obtains the location of the first CCE placed the DL_Grant and the scrambling sequence indication information $N_{SCID}$ according to blind detection so as to determine which set of the multiple sets of resource locations (or the resource location and the interference information of the corresponding location) configured by the base station is used. For example, when the UE 1 detects the aggregation level of the DL_Grant L=1 and nCCE, offset=0/2/4, or L=2 and nCCE, offset=0/4/8, or L=4 and nCCE, offset=0, or L=8 and nCCE, offset=0 and detects the scrambling sequence indication information of the DL_Grant $N_{SCID}$=0, a first set of resource locations (or the resource location and the interference information of the corresponding location) is selected; and when L=1 and nCCE, offset=1/3/5, or L=2 and nCCE, offset=2/6/10, or L=4 and nCCE, offset=4, or L=8 and nCCE, offset=8 and detects the scrambling sequence indication information of the DL_Grant $N_{SCID}$=0, a second set of resource locations (or the resource location and the interference information of the corresponding location) is selected. When the UE1 detects the aggregation level of the DL_Grant L=1 and nCCE, offset=0/2/4, or L=2 and nCCE, offset=0/4/8, or L=4 and nCCE, offset=0, or L=8 and nCCE, offset=0 and detects the scrambling sequence indication information of the DL_Grant $N_{SCID}$=1, a third set of resource locations (or the resource location and the interference information of the corresponding location) is selected; and when L=1 and nCCE, offset=1/3/5, or L=2 and nCCE, offset=2/6/10, or L=4 and nCCE, offset=4, or L=8 and nCCE, offset=8 and detects the scrambling sequence indication information of the DL_Grant $N_{SCID}$=1, a fourth set of resource locations (or the resource location and the interference information of the corresponding location) is selected.

Preferred Embodiment 10

UE1 is assumed to be a user of R11, the base station side configures multiple sets of resource locations (or the resource location and the interference information of the corresponding location) for the UE1 via a high-layer signaling, and then sends DL_Grant information in the PDCCH area or the EPDCCH area on the subframe on which the downlink service of the UE1 needs to be scheduled, so as to indicate that there is downlink data for the UE1 in the current subframe, and the UE1 performs blind detection on the subframe so as to obtain the indication information in the DL_Grant. Then the UE1 obtains the location of the first CCE placed the DL_Grant, the aggregation level and the scrambling sequence indication information $N_{SCID}$ according to blind detection so as to determine which set of the multiple sets of resource locations (or the resource location and the interference information of the corresponding location) configured by the base station is used. For example, when the UE1 detects the aggregation level of the DL_Grant L=1 and nCCE, offset=0/2/4, or L=2 and nCCE, offset=0/4/8 and detects the scrambling sequence indication information of the DL_Grant $N_{SCID}$=0, a first set of resource locations (or the resource location and the interference information of the corresponding location) is selected; when L=4 and nCCE, offset=0, or L=8 and nCCE, offset=0 and detects the scrambling sequence indication information of the DL_Grant $N_{SCID}$=0, a second set of resource locations (or the resource location and the interference information of the corresponding location) is selected; when L=1 and nCCE, offset=1/3/5, or L=2 and nCCE, offset=2/6/10 and detects the scrambling sequence indication information of the DL_Grant $N_{SCID}$=0, a third set of resource locations (or the resource location and the interference information of the corresponding location) is selected; and when L=4 and nCCE, offset=4, or L=8 and nCCE, offset=8 and detects the scrambling sequence indication information of the DL_Grant $N_{SCID}$=0, a fourth set of resource locations (or the resource location and the interference information of the corresponding location) is selected. When the UE1 detects the aggregation level of the DL_Grant L=1 and nCCE, offset=0/2/4, or L=2 and nCCE, offset=0/4/8 and detects the scrambling sequence indication information of the DL_Grant $N_{SCID}$=1, a fifth set of resource locations (or the resource location and the interference information of the corresponding location) is selected; when L=4 and nCCE, offset=0, or L=8 and nCCE, offset=0 and detects the scrambling sequence indication information of the DL_Grant $N_{SCID}$=1, a sixth set of resource locations (or the resource location and the interference information of the corresponding location) is selected; when L=1 and nCCE, offset=1/3/5, or L=2 and nCCE, offset=2/6/10 and detects the scrambling sequence indication information of the DL_Grant $N_{SCID}$=1, a seventh set of resource locations (or the resource location and the interference information of the corresponding location) is selected; and when L=4 and nCCE, offset=4, or L=8 and nCCE, offset=8 and detects the scrambling sequence indication information of the DL_Grant $N_{SCID}$=1, an eighth set of resource locations (or the resource location and the interference information of the corresponding location) is selected.

Preferred Embodiment 11

UE1 is assumed to be a user of R11, the base station side configures multiple sets of resource locations (or the resource location and the interference information of the corresponding location) for the UE1 via a high-layer signaling, and then sends DL_Grant information in the PDCCH area or the EPDCCH area on the subframe on which the downlink service of the UE1 needs to be scheduled, so as to indicate that there is downlink data for the UE1 in the current subframe, and the UE1 performs blind detection on the subframe so as to obtain the indication information in the DL_Grant. Then the UE1 obtains the location of the first CCE placed the DL_Grant and the new data indication information NDI in an invalid TB signaling according to blind detection so as to determine which set of the multiple sets of resource locations (or the resource location and the interference information of the corresponding location) configured by the base station is used. For example, when the UE1 detects the aggregation level of the DL_Grant L=1 and nCCE, offset=0/2/4, or L=2 and nCCE, offset=0/4/8, or L=4 and nCCE, offset=0, or L=8 and nCCE, offset=0 and detects the new data indication information in the invalid TB signaling of the DL_Grant NDI=0, a first set of resource locations (or the resource location and the interference information of the corresponding location) is selected; and when L=1 and nCCE, offset=1/3/5, or L=2 and nCCE, offset=2/6/10, or L=4 and nCCE, offset=4, or L=8 and nCCE, offset=8 and detects the new data indication information in the invalid TB signaling of the DL_Grant NDI=0, a second set of resource locations (or the resource location and the interference information of the corresponding location) is selected. When the UE1 detects the aggregation level of the DL_Grant L=1 and nCCE, offset=0/2/4, or L=2 and nCCE, offset=0/4/8, or L=4 and nCCE, offset=0, or L=8 and nCCE, offset=0 and detects the new data indication information in the invalid TB signaling of the DL_Grant NDI=1, a third set of resource locations (or the resource location and the interference information of the corresponding location) is selected; and when L=1 and nCCE, offset=1/3/5, or L=2 and nCCE, offset=2/6/10, or L=4 and nCCE, offset=4, or L=8 and nCCE, offset=8 and detects the new data indication information in the invalid TB signaling of the DL_Grant NDI=1, a fourth set of resource locations (or the resource location and the interference information of the corresponding location) is selected.

Preferred Embodiment 12

UE1 is assumed to be a user of R11, the base station side configures multiple sets of resource locations (or the resource location and the interference information of the corresponding location) for the UE1 via a high-layer signaling, and then sends DL_Grant information in the PDCCH area or the EPDCCH area on the subframe on which the downlink service of the UE 1 needs to be scheduled, so as to indicate that there is downlink data for the UE1 in the current subframe, and the UE1 performs blind detection on the subframe so as to obtain the indication information in the DL_Grant. Then the UE1 obtains the location of the first CCE placed the DL_Grant, the aggregation level and the new data indication information NDI in an invalid TB signaling according to blind detection so as to determine which set of the multiple sets of resource locations (or the resource location and the interference information of the corresponding location) configured by the base station is used. For example, when the UE1 detects the aggregation level of the DL_Grant L=1 and nCCE, offset=0/2/4, or L=2 and nCCE, offset=0/4/8 and detects the new data indication information in the invalid TB signaling of the DL_Grant NDI=0, a first set of resource locations (or the resource location and the interference information of the corresponding location) is selected; when L=4 and nCCE, offset=0, or L=8 and nCCE, offset=0 and detects the scrambling sequence indication information of the DL_Grant $N_{SCID}$=0, a second set of resource locations (or the resource location and the interference information of the corresponding location) is selected; when L=1 and nCCE, offset=1/3/5, or L=2 and nCCE, offset=2/6/10 and detects the new data indication information in the invalid TB signaling of the DL_Grant NDI=0, a third set of resource locations (or the resource location and the interference information of the corresponding location) is selected; and when L=4 and nCCE, offset=4, or L=8 and nCCE, offset=8 and detects the new data indication information in the invalid TB signaling of the DL_Grant NDI=0, a fourth set of resource locations (or the resource location and the interference information of the corresponding location) is selected. When the UE1 detects the aggregation level of the DL_Grant L=1 and nCCE, offset=0/2/4, or L=2 and nCCE, offset=0/4/8 and detects the new data indication information in the invalid TB signaling of the DL_Grant NDI=1, a fifth set of resource locations (or the resource location and the interference information of the corresponding location) is selected; when L=4 and nCCE, offset=0, or L=8 and nCCE, offset=0 and detects the new data indication information in the invalid TB signaling of the DL_Grant NDI=1, a sixth set of resource locations (or the resource location and the interference information of the corresponding location) is selected; when L=1 and nCCE, offset=1/3/5, or L=2 and nCCE, offset=2/6/10 and detects the new data indication information in the invalid TB signaling of the DL_Grant NDI=1, a seventh set of resource locations (or the resource location and the interference information of the corresponding location) is selected; and when L=4 and nCCE, offset=4, or L=8 and nCCE, offset=8 and detects the new data indication information in the invalid TB signaling of the DL_Grant NDI=1, an eighth set of resource locations (or the resource location and the interference information of the corresponding location) is selected.

Preferred Embodiment 13

UE1 is assumed to be a user of R11, the base station side configures multiple sets of resource locations (or the resource location and the interference information of the corresponding location) for the UE1 via a high-layer signaling, and then sends DL_Grant information in the PDCCH area or the EPDCCH area on the subframe on which the downlink service of the UE1 needs to be scheduled, so as to indicate that there is downlink data for the UE1 in the current subframe, and the UE1 performs blind detection on the subframe so as to obtain the indication information in the DL_Grant. Then the UE1 obtains the location of the first CCE placed the DL_Grant, the aggregation level and the located subframe and/or system frame number according to blind detection so as to determine which set of the multiple sets of resource locations (or the resource location and the interference information of the corresponding location) configured by the base station is used. For example, when the UE1 detects the aggregation level of the DL_Grant L=1 and nCCE, offset=0/2/4, or L=2 and nCCE, offset=0/4/8 or L=4 and nCCE, offset=0, or L=8 and nCCE, offset=0 and the subframe number of the located subframe is an odd-number subframe or the system frame number is an odd number, a first set of resource locations (or the resource location and the interference information of the corresponding location) is selected; when the UE1 detects the aggregation level of the DL_Grant L=1 and nCCE, offset=0/2/4, or L=2 and nCCE, offset=0/4/8 or L=4 and nCCE, offset=0, or L=8 and nCCE, offset=0 and the subframe number of the located subframe is an even-number subframe or the system frame number is an even number, a second set of resource locations (or the resource location and the interference information of the corresponding location) is selected; when L=1 and nCCE, offset=1/3/5, or L=2 and nCCE, offset=2/6/10 or L=4 and nCCE, offset=4, or L=8 and nCCE, offset=8 and the subframe number of the located subframe is an odd-number subframe or the system frame number is an odd number, a third set of resource locations (or the resource location and the interference information of the corresponding location) is selected; and when L=1 and nCCE, offset=1/3/5, or L=2 and nCCE, offset=2/6/10, or L=4 and nCCE, offset=4, or L=8 and nCCE, offset=8 and the subframe number of the located subframe is an even-number subframe or the system frame number is an even number, a fourth set of resource locations (or the resource location and the interference information of the corresponding location) is selected.

It should be noted that, the resource locations (or the resource location and the interference information of the corresponding location) of the above-mentioned embodiments 1 to 13 may include one of: 1. Location information of a plurality of resource elements needing rate matching or interference cancellation; 2. CRS configuration information; 3. PDSCH start location; 4. MBSFN subframe configuration information of a corresponding node; 5. Zero power CSI-RS configuration information; and 6. Non-zero power CSI-RS configuration information. The above-mentioned 6 specific situations have been depicted and described, and are not described here redundantly.

Preferred Embodiment 14

Please refer to table 3, as shown in table 3, each of resource indication parameters (i.e. resource indication information) can select different combinations of high-layer configuration, for example, when a first resource location and/or the interference information of the corresponding location is indicated, then the UE needs to perform rate matching and/or interference cancellation according to the resource configuration of resource location information 1 and the interference information of the corresponding location; when a second resource location and/or the interference information of the corresponding location is indicated, then the UE needs to perform rate matching and/or interference cancellation according to the resource configuration of resource location information 2 and the interference information of the corresponding location; when a third resource location and/or the interference information of the corresponding location is indicated, then the UE needs to perform rate matching and/or interference cancellation according to the resource configuration of resource location information 3 and the interference information of the corresponding location; when a fourth resource location and/or the interference information of the corresponding location is indicated, then the UE needs to perform rate matching and/or interference cancellation according to the resource configuration of resource location information {1, 2} and the interference information of the corresponding location; when a fifth resource location and/or the interference information of the corresponding location is indicated, then the UE needs to perform rate matching and/or interference cancellation according to the resource configuration of resource location information {1, 3} and the interference information of the corresponding location; when a sixth resource location and/or the interference information of the corresponding location is indicated, then the UE needs to perform rate matching and/or interference cancellation according to the resource configuration of resource location information {2, 3} and the interference information of the corresponding location; and when a seventh resource location and/or the interference information of the corresponding location is indicated, then the UE needs to perform rate matching and/or interference cancellation according to the resource configuration of resource location information {1, 2, 3} and the interference information of the corresponding location.

In a practical application, the combination of resource configuration and the notification of a transmission mode can be implemented, as shown in table 3, and at this moment, the UE can be informed of the transmission solution used by the current subframe by means of configuring different resource locations and the interference information of corresponding locations. In addition, each of resource information N (N=1, 2, 3) can be information of a corresponding actual node, and can include the CRS configuration information of the node, PDSCH start location, MBSFN subframe configuration information of a corresponding node, zero power CSI-RS configuration information and non-zero power CSI-RS configuration information.

TABLE 3

Correlation table of resource indication information, resource information and transmission modes

| Resource indication | Resource location information | CoMP transmission solutions |
|---|---|---|
| A first resource location and/or the interference information of corresponding location | Resource information 1 | DPS |
| A second resource location and/or the interference information of corresponding location | Resource information 2 | DPS |
| A third resource location and/or the interference information of corresponding location | Resource information 3 | DPS |
| A fourth resource location and/or the interference information of corresponding location | Resource information {1, 2} | JT |
| A fifth resource location and/or the interference information of corresponding location | Resource information {1, 3} | JT |

TABLE 3-continued

Correlation table of resource indication information, resource information and transmission modes

| Resource indication | Resource location information | CoMP transmission solutions |
|---|---|---|
| A sixth resource location and/or the interference information of corresponding location | Resource information {2, 3} | JT |
| A seventh resource location and/or the interference information of corresponding location | Resource information {1, 2, 3} | JT |
| An eighth resource location and/or the interference information of corresponding location | Resource information 1 | CS/CB |

Preferred Embodiment 15

UE1 is assumed to be a user of R11, the base station side configures multiple sets of resource locations (or the resource location and the interference information of the corresponding location) for the UE1 via a high-layer signaling, and then sends DL_Grant information in the PDCCH area or the EPDCCH area on the subframe on which the downlink service of the UE1 needs to be scheduled, so as to indicate that there is downlink data for the UE1 in the current subframe, and the UE1 performs blind detection on the subframe so as to obtain the indication information in the DL_Grant. Then the UE1 obtains a preset bit of 2 bits in DL_GrantDCI Format 2D by means of blind detection so as to determine which set of the multiple sets of resource locations (or the resource location and the interference information of the corresponding location) configured by the base station is used. For example, when the UE1 obtains that the value of the 2 preset bits in the DL_Grant is 00 according to blind detection, a first resource location is selected; and when the UE1 obtains that the value of the 2 preset bits in the DL_Grant is 01 according to blind detection, a second resource location is selected. When the UE1 obtains that the value of the 2 preset bits in the DL_Grant is 10 according to blind detection, a third resource location is selected. When the UE1 obtains that the value of the 2 preset bits in the DL_Grant is 11 according to blind detection, a fourth resource location is selected. After obtaining the resource location and the interference information of the corresponding location, the UE can control not to receive the downlink data on the corresponding resource location by means of using the rate matching, or assume that the base station does not map PDSCH on a corresponding location, or deem that the base station does not map PDSCH on the corresponding location, and perform rate matching on the corresponding location to receive the PDSCH.

In a practical application, the resource location includes at least one of the start location of OFDM symbol of a physical downlink shared channel (PDSCH) in a time domain, multicast broadcast single frequency network (MBSFN) subframe configuration information corresponding to the resource location, cell-specific reference signal (CRS) configuration information, zero power CSI-RS configuration information, non-zero power CSI-RS configuration information, and cycle and subframe offset configuration of the zero power CSI-RS and cycle and subframe offset configuration of the non-zero power CSI-RS. The zero power CSI-RS configuration information includes at least one of: a resource location of a zero power CSI-RS, the number of resource elements of the zero power CSI-RS and a cycle and subframe offset of the zero power CSI-RS. The non-zero power CSI-RS configuration information includes at least one of: the number of ports of non-zero power CSI-RS, the resource location of the non-zero power CSI-RS and the cycle and subframe offset of the non-zero power CSI-RS. The CRS configuration information includes one of: the number of ports of CRS, cell identification corresponding to the CRS and sending power of the CRS. The non-zero power CSI-RS configuration information and the CRS configuration information can be further used for indicating time-frequency synchronization when the terminal demodulates.

Using the downlink data processing method and downlink data processing and indicating method provided by the above-mentioned embodiments avoids the non-alignment of CRS and PDSCH start locations of different nodes and the impact of the CSI-RS on data demodulation performance, and can realize the coordinated transmission among different nodes to one UE (including: joint transmission, joint scheduling, joint beamforming, and dynamic node selection), thus achieving the effects of reduction in resource wastage, and prevention of interference to data demodulation from a control domain or a pilot frequency.

Figure 3:
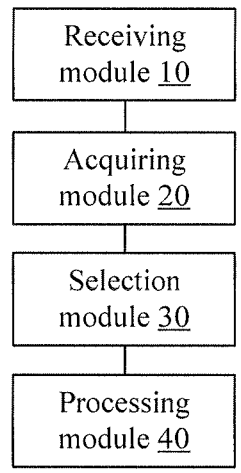
FIG. 3 is a structural block diagram of a device for processing downlink data located at the user equipment according to an embodiment of the disclosure.

FIG. 3 is a structural block diagram of a device for processing downlink data located at the user equipment according to an embodiment of the disclosure, and the device is applied to the user equipment (UE) for realizing the downlink data processing method provided by the above-mentioned embodiments, and as shown in FIG. 3, the device includes: a receiving module 10, an acquiring module 20, a selection module 30 and a processing module 40. A storage module 10 is configured to receive multiple sets of resource indication information configured for the user equipment (UE) by a base station and transmitted by the base station via a high-layer signaling; the acquiring module 20 coupled to the receiving module 10 is configured to receive a subframe transmitted by the base station, and acquire downlink grant indication information in the subframe; the selection module 30 coupled to the acquiring module 20 is configured to select from the multiple sets of resource indication information the resource indication information matching the downlink grant indication information, wherein the resource indication information is used for indicating a resource location having interference present, or, the resource location having interference present and interference information corresponding to the resource location; and the processing module 40 coupled to the selection module 30 is configured to process on the resource location the interference of downlink data transmitted to the UE.

In a practical application, the downlink grant control information includes at least one of: antenna port indication information, new data indication information of an invalid transmission block, scrambling sequence indication information, an aggregation level of downlink grant control information, a location of the first control channel element (CCE) of the downlink grant control information and one or more preset bits.

Figure 4:
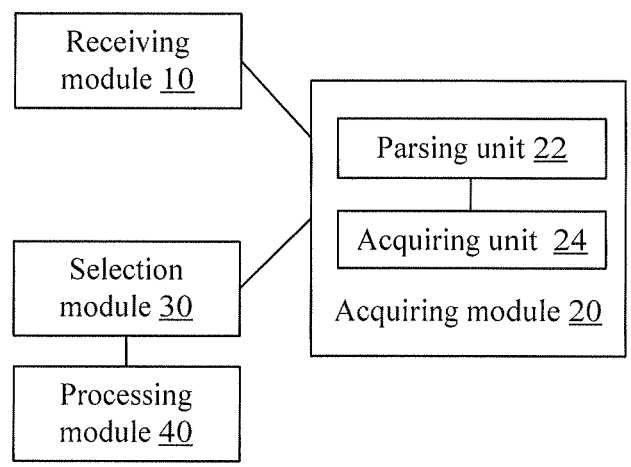
FIG. 4 is a structural block diagram of a device for processing downlink data located at the user equipment according to a preferred embodiment of the disclosure.

FIG. 4 is a structural block diagram of a device for processing downlink data located at the user equipment according to a preferred embodiment of the disclosure, and as shown in FIG. 4, the acquiring module 20 includes: a parsing unit 22 is configured to blindly detect the subframe and parse out the downlink grant information; and an acquiring unit 24 coupled to the parsing unit 22 is configured to blindly detect the downlink data corresponding to the UE indicated by the downlink grant information and acquire the downlink grant indication information.

In a preferred embodiment of the disclosure, when the resource indication information is used for indicating a resource location having interference present, the processing module prohibits the UE from receiving the downlink data on the resource location; or the processing module acquires that the base station does not map data on the resource corresponding to the resource location, wherein not mapping data includes: not mapping physical downlink shared channel data; or after acquiring that the base station does not map data on the resource corresponding to the resource location, the processing module performs rate matching on the resource location, wherein not mapping data includes: not mapping physical downlink shared channel data.

In a practical application, the resource location includes at least one of: the start location of OFDM symbol of a physical downlink shared channel (PDSCH) in a time domain, multicast broadcast single frequency network (MB-SFN) subframe configuration information corresponding to the resource location, cell-specific reference signal (CRS) configuration information, zero power CSI-RS configuration information, non-zero power CSI-RS configuration information, cycle and subframe offset of the zero power CSI-RS and cycle and subframe offset of the non-zero power CSI-RS.

In a preferred embodiment of the disclosure, when the resource indication information is used for indicating the resource location having interference present and interference information corresponding to the resource location, the processing module receives the downlink data at the resource location and performs interference cancellation on the downlink data according to the interference information corresponding to the resource location.

In a practical application, the resource location having interference present and interference information corresponding to the resource location includes at least one of: location information of a resource element needing interference cancellation, cell-specific reference signal (CRS) configuration information, zero power channel state information reference signal (CSI-RS) configuration information, non-zero power CSI-RS configuration information, the start location of OFDM symbol of a physical downlink shared channel (PDSCH) in a time domain and multicast broadcast single frequency network (MBSFN) subframe configuration information corresponding to the resource location.

Preferably, the CRS configuration information includes at least one of: the number of ports of CRS, cell identification corresponding to the CRS and sending power of the CRS; the zero power CSI-RS configuration information includes at least one of: a resource location of a zero power CSI-RS, the number of resource elements of the zero power CSI-RS and a cycle and subframe offset of the zero power CSI-RS; and the non-zero power CSI-RS configuration information includes at least one of: the number of ports of non-zero power CSI-RS, the resource location of the non-zero power CSI-RS and the cycle and subframe offset of the non-zero power CSI-RS.

Figure 5:
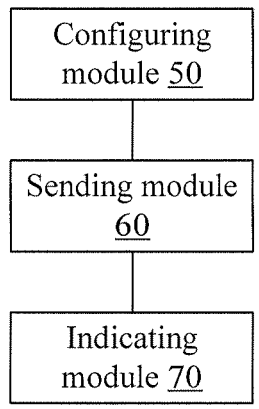
FIG. 5 is a structural block diagram of a device for processing and indicating downlink data located at a base station according to an embodiment of the disclosure.

FIG. 5 is a structural block diagram of a device for processing and indicating downlink data located at a base station according to an embodiment of the disclosure, and the device is located at the base station for realizing the downlink data processing and indicating method provided by the above-mentioned embodiments, and as shown in FIG. 5, the device mainly includes: a configuring module 50, a sending module 60 and an indicating module 70. The configuring module 50 is configured to configure multiple types of resource indication information for a user equipment (UE) via a UE-specific high-layer signaling; the sending module 60 coupled to the configuring module 50 is configured to send downlink subframe carrying downlink grant indication information to the UE; and the indicating module 70 coupled to the sending module 60 is configured to indicate the UE to process the interference of downlink data according to the resource indication information after the UE selects, from the multiple sets of resource indication information, the resource indication information matching the downlink grant indication information, where the resource indication information is used for indicating a resource location having interference present, or, the resource location having interference present and interference information corresponding to the resource location.

In a practical application, the resource indication information is used for indicating antenna port indication information, new data indication information of an invalid transmission block, scrambling sequence indication information, an aggregation level of downlink grant control information, a location of the first control channel element (CCE) of the downlink grant control information, one or more preset bits, a subframe number of a subframe where the downlink grant control information is located, a system frame number of a system frame where the downlink grant control information is located.

Figure 6:
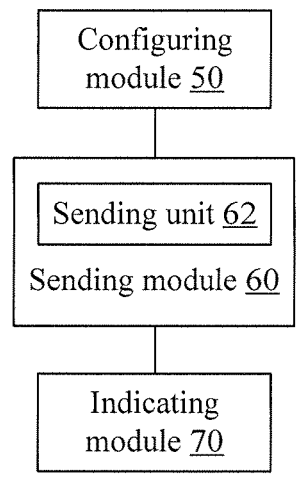
FIG. 6 is a structural block diagram of a device for processing and indicating downlink data located at a base station according to a preferred embodiment of the disclosure.

FIG. 6 is a structural block diagram of a device for processing and indicating downlink data located at a base station according to a preferred embodiment of the disclosure, and as shown in FIG. 6, the sending module 60 includes: a sending unit 62 is configured to carry downlink grant information in a physical downlink control channel (PDCCH) area or an enhance physical downlink control channel (EPDCCH) area on the subframe, and send the subframe to the UE, wherein the downlink grant information is used for indicating that the subframe carries downlink data corresponding to the UE.

In a preferred embodiment of the disclosure, the resource location includes at least one of: the start location of physical downlink shared channel (PDSCH) time domain OFDM symbol, multicast broadcast single frequency network (MBSFN) subframe configuration information corresponding to the resource location, cell-specific reference signal (CRS) configuration information, zero power CSI-RS configuration information, non-zero power CSI-RS configuration information, cycle and subframe offset configuration of the zero power CSI-RS and cycle and subframe offset configuration of the non-zero power CSI-RS.

In a preferred embodiment of the disclosure, the resource location having interference present and interference information corresponding to the resource location include at least one of: cell-specific reference signal (CRS) configuration information, zero power channel state information reference signal (CSI-RS) configuration information, non-zero power CSI-RS configuration information, the start location of OFDM symbol of a physical downlink shared channel (PDSCH) in a time domain and multicast broadcast single frequency network (MBSFN) subframe configuration information corresponding to the resource location.

In a practical application, the CRS configuration information can include at least one of: the number of ports of CRS, cell identification corresponding to the CRS and sending power of the CRS; the zero power CSI-RS configuration information includes at least one of: a resource location of a zero power CSI-RS, the number of resource elements of the zero power CSI-RS and a cycle and subframe offset of the zero power CSI-RS; and the non-zero power CSI-RS configuration information includes at least one of: the number of ports of non-zero power CSI-RS, the resource location of the non-zero power CSI-RS and the cycle and subframe offset of the non-zero power CSI-RS.

Using the downlink data processing device and downlink data processing and indicating device provided by the above-mentioned embodiments avoids the non-alignment of CRS and PDSCH start locations of different nodes and the impact of the CSI-RS on data demodulation performance, and can realize the coordinated transmission among different nodes to one UE (including: joint transmission, joint scheduling, joint beamforming, and dynamic node selection), thus achieving the effects of reduction in resource wastage, and prevention of interference to data demodulation from a control domain or a pilot frequency.

It can be seen from the above-mentioned description that the disclosure realizes the following technical effects: using the UE according to the downlink grant control information in the subframe received thereby and according to the downlink grant control information performing interference avoiding or interference cancellation on the downlink data transmitted to the UE avoids the non-alignment of CRS and PDSCH start locations of different nodes and the impact of the CSI-RS on data demodulation performance, and can realize the coordinated transmission among different nodes to one UE (including: joint transmission, joint scheduling, joint beamforming, and dynamic node selection), thus achieving the effects of reduction in resource wastage, and prevention of interference to data demodulation from a control domain or a pilot frequency.

Obviously, those skilled in the art should know that each of the mentioned modules or steps of the disclosure can be realized by universal computing devices; the modules or steps can be focused on single computing device, or distributed on the network formed by multiple computing devices; selectively, they can be realized by the program codes which can be executed by the computing device; thereby, the modules or steps can be stored in the storage device and executed by the computing device; and under some circumstances, the shown or described steps can be executed in different orders, or can be independently manufactured as each integrated circuit module, or multiple modules or steps thereof can be manufactured to be single integrated circuit module, thus to be realized. In this way, the disclosure is not restricted to any particular hardware and software combination.

The descriptions above are only the preferable embodiment of the disclosure, which are not used to restrict the disclosure, for those skilled in the art, the disclosure may have various changes and variations. Any amendments, equivalent substitutions, improvements, etc. within the principle of the disclosure are all included in the scope of the protection as defined by the appended claims of the disclosure.

What is claimed is:

1. A method for processing an interference of downlink data, comprising:
    a user equipment (UE) receiving multiple sets of resource indication information configured for the UE by a base station and transmitted by the base station via a high-layer signaling;
    the UE receiving a subframe transmitted by the base station, and acquiring downlink grant indication information in the subframe;

the UE selecting, from the multiple sets of resource indication information, a resource indication information matching the downlink grant indication information, wherein the resource indication information is used for indicating a first resource location having interference present, or, a second resource location having interference present and interference information corresponding to the second resource location; and the UE processing on the first or the second resource location the interference of the downlink data which is transmitted to the UE;

wherein the first resource location carries at least: first zero power Channel State Information Reference signal (CSI-RS) configuration information and first non-zero power CSI-RS configuration information;

when the resource indication information is used for indicating the first resource location having interference present, the UE processing the interference of the downlink data on the first resource location comprises:

prohibiting the UE from receiving the downlink data on the first resource location, or, the UE acquiring that the base station does not map data on resources corresponding to the first resource location, wherein not mapping data comprises: not mapping physical downlink shared channel data, or, after acquiring that the base station does not map data on resources corresponding to the first resource location, the UE performing rate matching on the first resource location, wherein not mapping data comprises: not mapping physical downlink shared channel data;

wherein the second resource location having interference present and the interference information corresponding to the second resource location carries at least: second zero power CSI-RS configuration information and second non-zero power CSI-RS configuration information;

when the resource indication information is used for indicating the second resource location having interference present and the interference information corresponding to the second resource location, the UE processing the interference of the downlink data on the second resource location comprises:

the UE receiving the downlink data at the second resource location, and the UE performing interference cancellation on the downlink data according to the interference information corresponding to the second resource location;

wherein the first zero power CSI-RS configuration information comprises at least one of: a resource location of a first zero power CSI-RS, a number of resource elements of a first zero power CSI-RS and a cycle and subframe offset of a first zero power CSI-RS;

wherein the second zero power CSI-RS configuration information comprises at least one of: a resource location of a second zero power CSI-RS, a number of resource elements of a second zero power CSI-RS and a cycle and subframe offset of a second zero power CSI-RS;

wherein the first non-zero power CSI-RS configuration information comprises at least one of: a number of ports of a first non-zero power CSI-RS, a resource location of a first non-zero power CSI-RS and a cycle and subframe offset of a first non-zero power CSI-RS;

wherein the second non-zero power CSI-RS configuration information comprises at least one of: a number of ports of a second non-zero power CSI-RS, a resource location of a second non-zero power CSI-RS and a cycle and subframe offset of a second non-zero power CSI-RS.

2. The method according to claim 1, wherein the downlink grant indication information comprises at least one of:

antenna port indication information, new data indication information of an invalid transmission block, scrambling sequence indication information, an aggregation level of a downlink grant control information, a location of a first control channel element (CCE) of a downlink grant control information, one or more preset bits, a subframe number of a subframe where a downlink grant control information is located, and a system frame number of a system frame where a downlink grant control information is located.

3. The method according to claim 2, wherein the UE receiving the multiple sets of resource indication information configured for the UE by the base station and transmitted by the base station via the high-layer signaling comprises: the UE receiving the multiple sets of resource indication information configured for the UE by the base station via a UE-specific high-layer signaling; and the UE receiving the subframe transmitted by the base station comprises: the UE receiving downlink grant information carried in a physical downlink control channel (PDCCH) area or an enhance physical downlink control channel (EPDCCH) area on the subframe transmitted by the base station, wherein the downlink grant information is used for indicating that the subframe transmitted by the base station carries downlink data corresponding to the UE.

4. The method according to claim 3, wherein the UE acquiring the downlink grant indication information in the subframe comprises:

the UE blindly detecting the subframe transmitted by the base station and parsing out the downlink grant information; and blindly detecting the downlink data corresponding to the UE indicated by the downlink grant information and acquiring the downlink grant indication information.

5. The method according to claim 1, wherein, the first resource location further carries at least one of: a start location of Orthogonal Frequency Division Multiplexing (OFDM) symbol of a physical downlink shared channel (PDSCH) in a time domain, multicast broadcast single frequency network (MBSFN) subframe configuration information corresponding to the first resource location, first cell-specific reference signal (CRS) configuration information, cycle and subframe offset of a first zero power CSI-RS and cycle and subframe offset of a first non-zero power CSI-RS;

the second resource location having interference present and the interference information corresponding to the second resource location carries at least one of: second cell-specific reference signal (CRS) configuration information, a start location of a physical downlink shared channel (PDSCH) and multicast broadcast single frequency network (MBSFN) subframe configuration information corresponding to the second resource location; and the first or the second CRS configuration information comprises at least one of: a number of ports of CRS, cell identification corresponding to CRS and sending power of CRS.

6. An indicating method for processing downlink data, comprising:

a base station sending, to a user equipment (UE) via a high-layer signaling, multiple sets of resource indication information configured for the UE by the base station;

the base station sending downlink subframe carrying downlink grant indication information to the UE; and after the UE selects, from the multiple sets of resource indication information, a resource indication information matching the downlink grant indication information, the base station indicating the UE to process interference of the downlink data according to the resource indication information, wherein the resource indication information is used for indicating a first resource location having interference present, or, a second resource location having interference present and interference information corresponding to the second resource location;

the first resource location carries at least one of: a start location of a Orthogonal Frequency Division Multiplexing (OFDM) symbol of a physical downlink shared channel (PDSCH) in a time domain, multicast broadcast single frequency network (MBSFN) subframe configuration information corresponding to the first resource location, first cell-specific reference signal (CRS) configuration information, first zero power Channel State Information Reference signal (CSI-RS) configuration information, first non-zero power CSI-RS configuration information, cycle and subframe offset of a first zero power CSI-RS and cycle and subframe offset of a first non-zero power CSI-RS;

the second resource location having interference present and interference information corresponding to the second resource location carries at least one of: second cell-specific reference signal (CRS) configuration information, second zero power channel state information reference signal (CSI-RS) configuration information, second non-zero power CSI-RS configuration information, a start location of OFDM symbol of a physical downlink shared channel (PDSCH) in a time domain and multicast broadcast single frequency network (MBSFN) subframe configuration information corresponding to the second resource location;

wherein the first or the second CRS configuration information comprises at least one of: a number of ports of CRS, cell identification corresponding to CRS and sending power of CRS;

wherein the first zero power CSI-RS configuration information comprises at least one of: a resource location of a first zero power CSI-RS, a number of resource elements of a first zero power CSI-RS and a cycle and subframe offset of a first zero power CSI-RS;

wherein the second zero power CSI-RS configuration information comprises at least one of: a resource location of a second zero power CSI-RS, a number of resource elements of a second zero power CSI-RS and a cycle and subframe offset of a second zero power CSI-RS;

wherein the first non-zero power CSI-RS configuration information comprises at least one of: a number of ports of a first non-zero power CSI-RS, a resource location of a first non-zero power CSI-RS and a cycle and subframe offset of a first non-zero power CSI-RS; and wherein the second non-zero power CSI-RS configuration information comprises at least one of: a number of ports of a second non-zero power CSI-RS, a resource location of a second non-zero power CSI-RS and a cycle and subframe offset of a second non-zero power CSI-RS.

7. The method according to claim 6, wherein the downlink grant indication information comprises at least one of: antenna port indication information, new data indication information of an invalid transmission block, scrambling sequence indication information, an aggregation level of a downlink grant control information, a location of a first control channel element (CCE) of a downlink grant control information, one or more preset bits, a subframe number of a subframe where a downlink grant control information is located, and a system frame number of a system frame where a downlink grant control information is located.

8. The method according to claim 7, wherein the base station sending, to the UE via the high-layer signaling, the multiple sets of resource indication information configured for the UE by the base station comprises: the base station sending, to the UE via a UE-specific high-layer signaling, the multiple sets of resource indication information configured for the UE; and the base station sending the downlink subframe carrying the downlink grant indication information to the UE comprises: the base station setting downlink grant information in a physical downlink control channel (PDCCH) area or an enhance physical downlink control channel (EPDCCH) area on the downlink subframe, and sending the downlink subframe to the UE, wherein the downlink grant information is used for indicating that the downlink subframe carries downlink data corresponding to the UE.

9. The method according to claim 6, wherein when the resource indication information is used for indicating the first resource location having interference present, the base station indicating the UE to process the interference of the downlink data according to the resource indication information comprises:

the base station indicating the UE to prohibit the UE from receiving the downlink data on the first resource location or, the base station informing the UE that the base station does not map data on resources corresponding to the first resource location, wherein not mapping data comprises: not mapping physical downlink shared channel data or, after informing the UE that the base station does not map data on resources corresponding to the first resource location, the base station indicating the UE to perform rate matching on the first resource location, wherein not mapping data comprises: not mapping physical downlink shared channel data;

or, when the resource indication information is used for indicating the second resource location having interference present and the interference information corresponding to the second resource location, the base station indicating the UE to process on the second resource location the interference of the downlink data transmitted to the UE comprises:

the base station indicating the UE to receive the downlink data at the second resource location; and the base station indicating the UE to perform interference cancellation on the downlink data according to the interference information corresponding to the second resource location.

10. A user equipment (UE) comprising a memory and a hardware processor configured to execute programming modules stored in the memory, wherein the programming modules includes:
- a receiving module configured to receive multiple sets of resource indication information configured for the UE by a base station and transmitted by the base station via a high-layer signaling;
- an acquiring module configured to receive a subframe transmitted by the base station, and acquire downlink grant indication information in the subframe;
- a selection module configured to select from the multiple sets of resource indication information a resource indication information matching the downlink grant indication information, wherein the resource indication information is used for indicating a first resource location having interference present, or, a second resource location having interference present and interference information corresponding to the second resource location; and
- a processing module configured to process on the first or the second resource location an interference of downlink data transmitted to the UE;
- wherein the first resource location comprises at least: first zero power Channel State Information Reference signal (CSI-RS) configuration information and first non-zero power CSI-RS configuration information,
- when the resource indication information is used for indicating the first resource location having interference present,
- the processing module prohibits the UE from receiving the downlink data on the first resource location, or,
- the processing module acquires that the base station does not map data on resources corresponding to the first resource location, wherein not mapping data comprises: not mapping physical downlink shared channel data, or,
- after acquiring that the base station does not map data on resources corresponding to the first resource location, the processing module performs rate matching on the first resource location, wherein not mapping data comprises: not mapping physical downlink shared channel data;
- wherein the second resource location having interference present and interference information corresponding to the second resource location comprise at least: second zero power channel state information reference signal (CSI-RS) configuration information and second non-zero power CSI-RS configuration information,
- when the resource indication information is used for indicating the second resource location having interference present and interference information corresponding to the second resource location,
- the processing module receives the downlink data at the second resource location and performs interference cancellation on the downlink data according to the interference information corresponding to the second resource location;
- wherein:
- the first zero power CSI-RS configuration information comprises at least one of: a resource location of a first zero power CSI-RS, a number of resource elements of a first zero power CSI-RS and a cycle and subframe offset of a first zero power CSI-RS;
- the second zero power CSI-RS configuration information comprises at least one of: a resource location of a second zero power CSI-RS, a number of resource elements of a second zero power CSI-RS and a cycle and subframe offset of a second zero power CSI-RS;
- the first non-zero power CSI-RS configuration information comprises at least one of: a number of ports of a first non-zero power CSI-RS, a resource location of a first non-zero power CSI-RS and a cycle and subframe offset of the first non-zero power CSI-RS; and
- the second non-zero power CSI-RS configuration information comprises at least one of: a number of ports of a second non-zero power CSI-RS, a resource location of a second non-zero power CSI-RS and a cycle and subframe offset of a second non-zero power CSI-RS.

11. The UE according to claim 10, wherein the downlink grant indication information comprises at least one of:
- antenna port indication information, new data indication information of an invalid transmission block, scrambling sequence indication information, an aggregation level of a downlink grant control information, a location of a first control channel element (CCE) of a downlink grant control information and one or more preset bits.

12. The UE according to claim 11, wherein the acquiring module executed by the hardware processor comprises:
- a parsing unit configured to blindly detect the subframe and parse out downlink grant information; and
- an acquiring unit configured to blindly detect downlink data corresponding to the UE indicated by the downlink grant information and acquire the downlink grant indication information.

13. The UE according to claim 10, wherein,
- the first resource location further carries at least one of: a start location of Orthogonal Frequency Division Multiplexing (OFDM) symbol of a physical downlink shared channel (PDSCH) in a time domain, multicast broadcast single frequency network (MBSFN) subframe configuration information corresponding to the first resource location, first cell-specific reference signal (CRS) configuration information, cycle and subframe offset of a first zero power CSI-RS and cycle and subframe offset of a first non-zero power CSI-RS,
- the second resource location having interference present and the interference information corresponding to the second resource location carries at least one of: second cell-specific reference signal (CRS) configuration information, a start location of OFDM symbol of a physical downlink shared channel (PDSCH) in a time domain, multicast broadcast single frequency network (MBSFN) subframe configuration information corresponding to the second resource location and location information of a resource element needing interference cancellation; and
- the first or the second CRS configuration information comprises at least one of: a number of ports of CRS, cell identification corresponding to CRS and sending power of CRS.

14. A base station comprising a memory and a hardware processor configured to execute programming modules stored in the memory, wherein the programming modules includes:
- a configuring module configured to configure multiple sets of resource indication information for a user equipment (UE) via a UE-specific high-layer signaling;
- a sending module configured to send downlink subframe carrying downlink grant indication information to the UE; and
- an indicating module configured to, after the UE selects, from the multiple sets of resource indication information, a resource indication information matching the downlink grant indication information, indicate the UE to process an interference of downlink data according to the resource indication information, wherein the resource indication information is used for indicating a first resource location having interference present, or, a second resource location having interference present and interference information corresponding to the second resource location;

wherein the first resource location carries at least one of: a start location of Orthogonal Frequency Division Multiplexing OFDM symbol of a physical downlink shared channel (PDSCH) in a time domain, multicast broadcast single frequency network (MBSFN) subframe configuration information corresponding to the first resource location, first cell-specific reference signal (CRS) configuration information, first zero power Channel State Information Reference signal (CSI-RS) configuration information, first non-zero power CSI-RS configuration information, cycle and subframe offset configuration of a first zero power CSI-RS and cycle and subframe offset configuration of a first non-zero power CSI-RS;

wherein the second resource location having interference present and interference information corresponding to the second resource location carries at least one of: second cell-specific reference signal (CRS) configuration information, second zero power channel state information reference signal (CSI-RS) configuration information or second non-zero power CSI-RS configuration information, a start location of OFDM symbol of a physical downlink shared channel (PDSCH) in a time domain and multicast broadcast single frequency network (MBSFN) subframe configuration information corresponding to the second resource location;

wherein: the first or the second CRS configuration information at least comprises one of: a number of ports of CRS, cell identification corresponding to CRS and sending power of CRS;

the first zero power CSI-RS configuration information comprises at least one of: a resource location of a first zero power CSI-RS, a number of resource elements of a first zero power CSI-RS and a cycle and subframe offset of a first zero power CSI-RS;

the second zero power CSI-RS configuration information comprises at least one of: a resource location of a second zero power CSI-RS, a number of resource elements of a second zero power CSI-RS and a cycle and subframe offset of a second zero power CSI-RS;

the first non-zero power CSI-RS configuration information comprises at least one of: a number of ports of a first non-zero power CSI-RS, a resource location of a first non-zero power CSI-RS and a cycle and subframe offset of a first non-zero power CSI-RS; and the second non-zero power CSI-RS configuration information comprises at least one of: a number of ports of a second non-zero power CSI-RS, a resource location of a second non-zero power CSI-RS and a cycle and subframe offset of a second non-zero power CSI-RS.

15. The base station according to claim 14, wherein the downlink grant indication information comprises at least one of:

antenna port indication information, new data indication information of an invalid transmission block, scrambling sequence indication information, an aggregation level of a downlink grant control information, a location of a first control channel element (CCE) of a downlink grant control information, one or more preset bits, a subframe number of a subframe where a downlink grant control information is located, and a system frame number of a system frame where a downlink grant control information is located.

16. The base station according to claim 15, wherein the sending module executed by the hardware processor comprises:

a sending unit configured to set downlink grant information in a physical downlink control channel (PDCCH) area or an enhance physical downlink control channel (EPDCCH) area on the downlink subframe, and send the downlink subframe to the UE, wherein the downlink grant information is used for indicating that the downlink subframe carries downlink data corresponding to the UE.

* * * * *